United States Patent [19]

Kilkki

[11] Patent Number: 6,047,326
[45] Date of Patent: *Apr. 4, 2000

[54] ACCOUNTING SYSTEM AND METHOD FOR A NOMINAL BIT RATE NETWORK SERVICE

[75] Inventor: Matti Kalevi Kilkki, Espoo, Finland

[73] Assignee: Nokia Telecommunications, Oy, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,270

[22] Filed: Mar. 20, 1997

[51] Int. Cl.[7] ........................... G06F 13/14; H04L 12/14; H04L 12/26

[52] U.S. Cl. .................. 709/228; 370/232; 709/223; 379/114

[58] Field of Search ................................. 370/251, 253, 370/397, 395, 232, 234; 379/93.01, 93.08, 114, 140, 130, 131, 115, 133; 395/183.13, 200.54; 705/1, 32; 714/37; 709/224, 223, 228

[56] References Cited

U.S. PATENT DOCUMENTS

| | | | |
|---|---|---|---|
| 5,153,877 | 10/1992 | Esaki et al. | 370/94.1 |
| 5,287,347 | 2/1994 | Spanke | 370/60 |
| 5,359,593 | 10/1994 | Derby et al. | 370/234 |
| 5,541,913 | 7/1996 | Witters et al. | 370/17 |
| 5,559,798 | 9/1996 | Clarkson et al. | 370/232 |
| 5,757,784 | 5/1998 | Liebowitz et al. | 370/321 |
| 5,768,521 | 6/1998 | Dedrick | 395/200.54 |
| 5,784,358 | 7/1998 | Smith et al. | 370/230 |

OTHER PUBLICATIONS

Technical Committee, Traffic Management Specification Version 4.0, af–tm–00561.000, Apr. 1996, pp. 1–59.

Integrated Services Digital Network (ISDN) Overall Network Aspects and Functions, Traffic Control and Congestion Control in B–ISDN, ITU–T Recommendation I.371, Mar. 1993, pp. 1–27.

What are the meaning of CBR, VBR, ABR, UBR?, Maintained by Carl Symborski, Last Changed Aug. 20, 1996, pp. 1–2 and 1–5.

ATM Service Categories: The Benefits to the User, Editor: Libio Lambaarelli, CSELT' Torino, Italy, pp. 1–10.

An Overview of ATM Technology, Gary Kessler, Jan. 1995, pp. 1–10.

ATM—The New Technology for Tomorrow's B–ISDN, Engui Yao, Dec. 1994, pp. 1–23.

*Primary Examiner*—Mark H. Rinehart
*Assistant Examiner*—Marc D Thompson
*Attorney, Agent, or Firm*—Altera Law Group, LLC

[57] ABSTRACT

A system and method for charging for usage of a network service connection. The network includes access nodes which provide user access to core nodes of the network. At an access node, the traffic of connections associated with the access node is measured. A nominal bit rate (NBR) associated with the access node is used together with the traffic measurement to compute a priority level at the access node. The value of NBR represents an expected, but not guaranteed, bit rate associated with a particular user or connection. The connection may be a real-time or a non-real-time connection. Information elements, transmitted from the access node to a core network node, are each assigned one of several priority levels, and cells are either accepted or discarded based on priority level and the status of one or more buffers at the core node. A charging schedule, based on a maximum allowed NBR established for the user, accounts for both a fixed or non-fixed monthly fee and a time dependent fee portion. The charging scheme may take into account that the NBR may be different for upstream and downstream transmissions. A charging counter, which accounts for the cost of connection usage, may be updated on a periodic basis, such as once a second for example, or on a non-periodic basis.

8 Claims, 11 Drawing Sheets

ACCOUNTING SYSTEM AND METHOD FOR A NOMINAL BIT RATE NETWORK SERVICE

FIELD OF THE INVENTION

The present invention relates generally to communications systems, and more particularly, to a system and method for charging for usage of a network service connection.

BACKGROUND OF THE INVENTION

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Notwithstanding the complexity of conventional ATM traffic management schemes, current ATM specifications and recommendations fail to adequately address the need of service providers for a methodology that provides for accurate and reliable charging of services utilized by user's of the network. Even if one were to assume that a charging scheme that accounts for most or all of the currently defined ATM traffic management properties could be developed, such a scheme would necessarily be complex and would typically require administration by highly skilled operators. The high overhead and maintenance costs to support such a billing scheme would likely be passed on to the network provider and, ultimately, to the network user.

Some commentators have suggested that a solution to these problems may be found by increasing the bandwidth or capacity of the network (e.g., the Internet). Implementing this overly simplistic solution would require an appreciable investment of hardware, software, and, most likely, replacing existing communication lines with high bandwidth transmission lines, such as fiber optic lines. This suggested solution, however, would likely result in undisciplined network expansion and uncoordinated management of network traffic. Also, such a solution, if implemented, would appear to obviate the need for much of the sophisticated traffic management features currently defined in ATM specifications.

Accordingly, there is a need in the communications industry for a network management architecture and method that is simple in concept and in its implementation, yet adequately addresses the quality of service requirements to support a variety of network services, including real-time and non-real-time services. There exists a further need for a system and methodology that provides for the implementation of a simple and effective charging capability that accounts for the use of a network service connection. The present invention fulfills these and other needs which remain unaddressed by prior art network traffic management approaches.

SUMMARY OF THE INVENTION

The present invention is directed to a system and method for charging for usage of a network service connection. The network includes access nodes which provide user access to core nodes of the network. At an access node, the traffic of connections associated with the access node is measured. A nominal bit rate (NBR), which is established by the user or the system for the access node, is used together with the traffic measurement at the access node to compute a priority level. The value of NBR represents an expected, but not guaranteed, bit rate associated with a particular user or connection. The connection may be a real-time or a non-real-time connection. Information elements transmitted from the access node to a core network node are each assigned one of several priority levels, such as one of eight priority levels. Information elements received at the core node are either accepted or discarded based on the priority level of the information elements and the status of one or more buffers at the core node.

In accordance with one embodiment of the present invention, an access node includes a user/network interface, and a core network node includes a cell filtering unit. The UNI includes a measuring unit which measures the actual momentary bit rate of a connection between the UNI and the core node. The UNI also includes a priority level computing unit that computes the priority level of each cell using the measured bit rate and the established NBR. A scheduling unit of a node accepts or discards an arriving cell based on the occupancy of a real-time buffer and a non-real-time buffer provided at the node. Cells accepted by the scheduling unit are transferred to either the real-time buffer or the non-real-time buffer depending on cell type.

In general, cells are transferred out of the real-time buffer in preference to cells in the non-real-time buffer. In an alternative embodiment, a UNI may include two bit rate measuring units for measuring a short-term and a long-term bit rate of the connection. The priority level computing unit then computes cell priority values using the NBR and the short-term and long-term actual bit rates.

Users may be charged for connection usage on a number of bases, including a minute, hour, weekly, monthly, or transactional basis, for example. A charging schedule may be employed that accounts for both a fixed or non-fixed monthly fee, as well as a time dependent fee based on the time duration of the connection. In accordance with an embodiment in which charges are assessed on a monthly basis, a monthly fee is based on a maximum allowed NBR which is selected by, or otherwise established for, the user. In addition, a time dependent portion of the monthly fee may be assessed which is proportional to the user's NBR for each connection at a given point in time. A charging scheme may take into account that the NBR may be different for upstream and downstream transmissions. A charging counter, which accounts for cost of connection usage, may be updated on a periodic basis, such as once a second for example, or on a non-periodic basis.

DETAILED DESCRIPTION OF THE VARIOUS EMBODIMENTS

Figure 1:
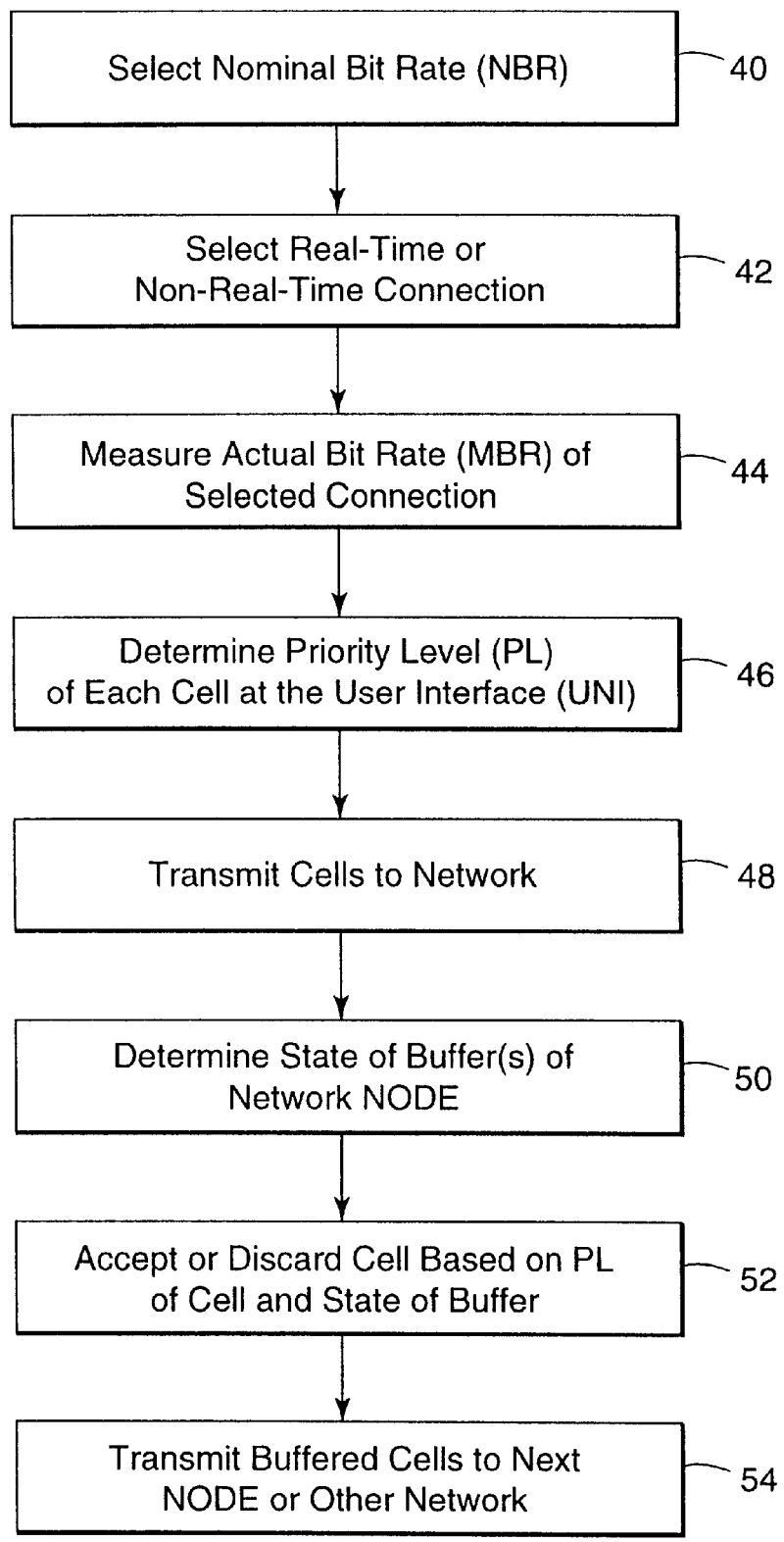
FIG. 1 is a flow diagram illustrating a general procedure for communicating cells of information between a user/network interface and a network using a nominal bit rate service in accordance with an embodiment of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to an improved system and method for managing the communication of information over a network and charging for use of a service connection provided over the network. An embodiment of the present invention exploits many of the advantageous aspects of ATM technology while obviating many of the disadvantages associated with conventional ATM traffic control approaches. A network or group of networks, such as the Internet, may be implemented using the principles of the present invention so as to significantly reduce the complexity and cost of the traffic management scheme required to effectively manage the flow of information through the network.

A network implemented in accordance with the principles of the present invention provides network operators the capability to offer simple and understandable services to network users, including real-time and non-real-time services. Charging for use of network services and accounting for such service usage may be realized by implementing a relatively simple accounting scheme. The complexity of network nodes may be significantly reduced, while still accommodating high capacity throughput, particularly within a core network. Further, many advantageous features of ATM technology, such as the provision of very fast and large inexpensive switches, and the potential of ensuring short delays for interactive connections, may be realized by adopting the new network service paradigm of the present invention that exploits the structure of the ATM cell divorced from the complex traffic management requirements imposed by current ATM specifications.

The service concept described herein may be viewed as a Simple Integrated Media Access (SIMA) service model. The SIMA service model incorporates the basic properties of ATM with the addition of eight priority levels as defined within the context of a new service concept termed a nominal bit rate (NBR) service. In general, the NBR service provides for the simple and efficient division of network capacity amongst different connections and the charging of user fees for the use of such connections. A network that embraces a basic version of the SIMA service model does not need to perform many of the traditional and burdensome traffic management functions involving traffic descriptors, quality of service parameters, service classes, connection admission control (CAC), or usage parameter control (UPC). All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or crossconnects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

A network traffic management methodology, in accordance with one embodiment of the present invention, involves allocating connection bandwidth amongst multiple users on the basis of a nominal bit rate established for each user or connection. The value of NBR, typically measured in bits per second (bits/sec), represents an expected bit rate associated with a particular user or connection that may, in actuality, vary from the established value. An NBR attributed to a particular user or connection may be constant or, alternatively, varied over the life of a connection. Moreover, the realized or actual bit rate for a given connection may exceed the established NBR value.

Establishing an NBR for each user or connection provides a basis for determining expected bandwidth utilization and the division of network capacity amongst the connections, especially during overload situations. In general terms, the division of network capacity is determined using a prioritization scheme by which each cell of information communicated through the network is assigned a priority level. The process of determining the priority level of a cell is performed at the user/network interface (UNI) using the value of NBR and an actual or measured bit rate (MBR). In accordance with one embodiment of the present invention, each cell is assigned one of eight priority levels that range between zero, which indicates highest priority or importance, and seven, which indicates lowest priority or criticality.

A properly dimensioned network founded on the NBR concept of the present invention differs from conventional network paradigms in the respect that the network operator of an NBR service does not precisely guarantee a specified bit rate or a specified quality of service for a particular connection. Those skilled in the art understand that conventional network traffic management schemes which guarantee a specified connection bit rate and service quality in accordance with current ATM specifications are inherently complex. The skilled artisan, after considering the novel NBR concepts disclosed herein, will readily appreciate that significantly less complex, yet reliable, networks can be constructed which offer both real-time and non-real-time services. Interoperability between traditional ATM connections and NBR service connections, however, may be provided through use of the disclosed prioritization scheme, such as by use of a priority zero designation for the communication of cells over a traditional ATM connection, as will be discussed later in greater detail.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. Depending on a particular application, the user selects 42 a real-time or a non-real-time network connection. Interoperability between traditional ATM connections and NBR service connections, however, may be provided through use of the disclosed prioritization scheme, such as by use of a priority zero designation for the communication of cells over a traditional ATM connection, as will be discussed later in greater detail.

The process of determining the priority level (PL) of each cell, which indicates the importance or criticality of the cell relative to other cells, involves measuring 44 the actual or measured bit rate, MBR, of the selected real-time or non-real-time connection at the UNI. The priority level of each cell is determined 46 at the UNI using a ratio of the measured bit rate, MBR, and the nominal bit rate, NBR.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
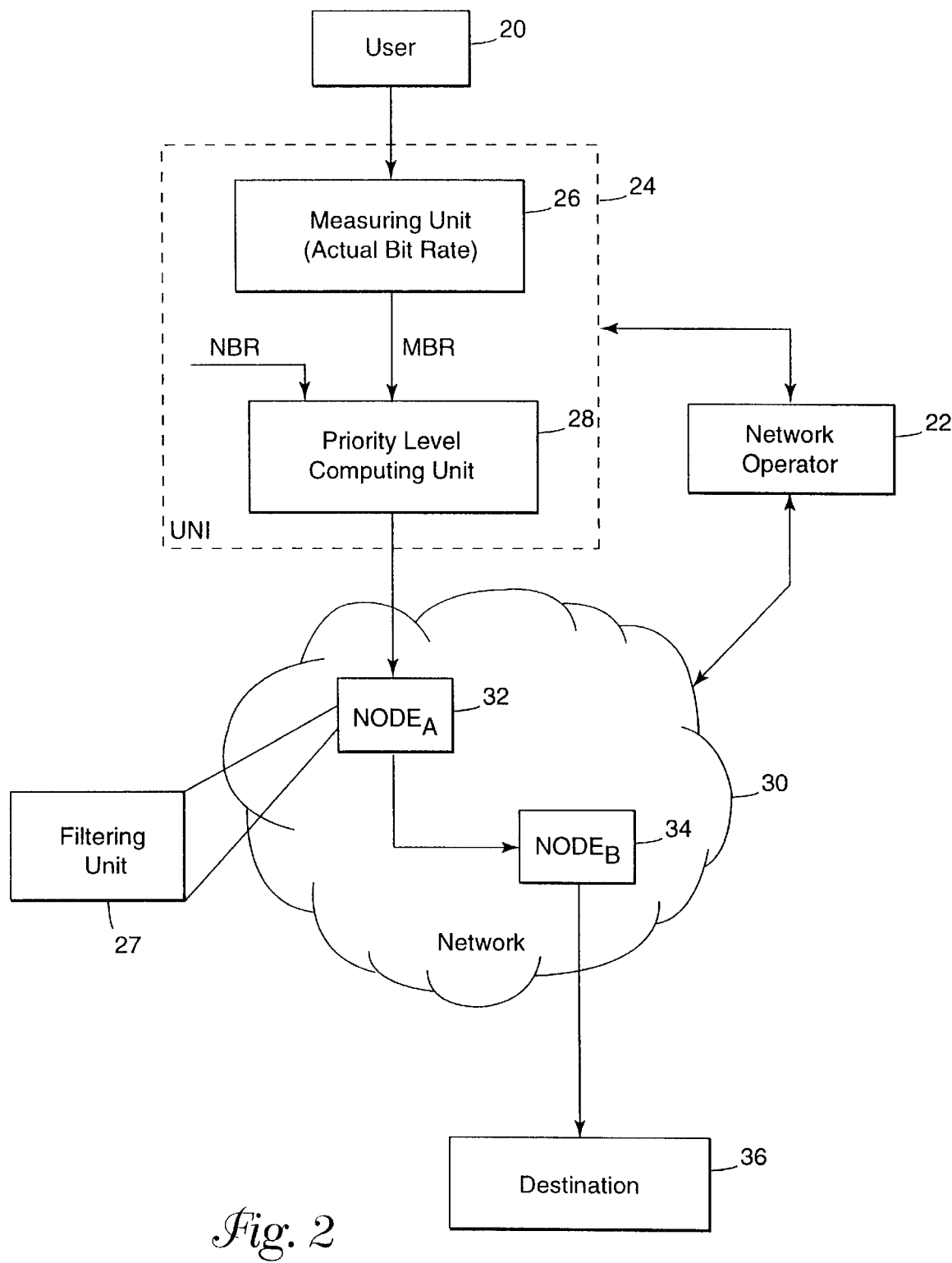
FIG. 2 is a system block diagram of a nominal bit rate service architecture in accordance with an embodiment of the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of a established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as node$_A$ 32. The node$_A$ 32 accepts or discards the cell received from the UNI 24 based on the priority level of the cell and the buffering capacity of node$_A$ 32. In general, as the occupancy of the buffer or memory of node$_A$ 32 increases (i.e., becomes more filled), cells having a lower priority (i.e., higher priority level value) are discarded in favor of accepting cells having a higher priority (i.e., lower priority level value). As the occupancy level of the buffer of node$_A$ 32 decreases (i.e., becomes less filled), the node$_A$ 32 becomes increasingly tolerant toward accepting cells of lower priority (i.e., higher priority level values). Cells that are buffered in node$_A$ 32 are subsequently transmitted to another node in the network 30, such as node$_B$ 34, or other network and, ultimately, to an end-destination 36.

Figure 3:
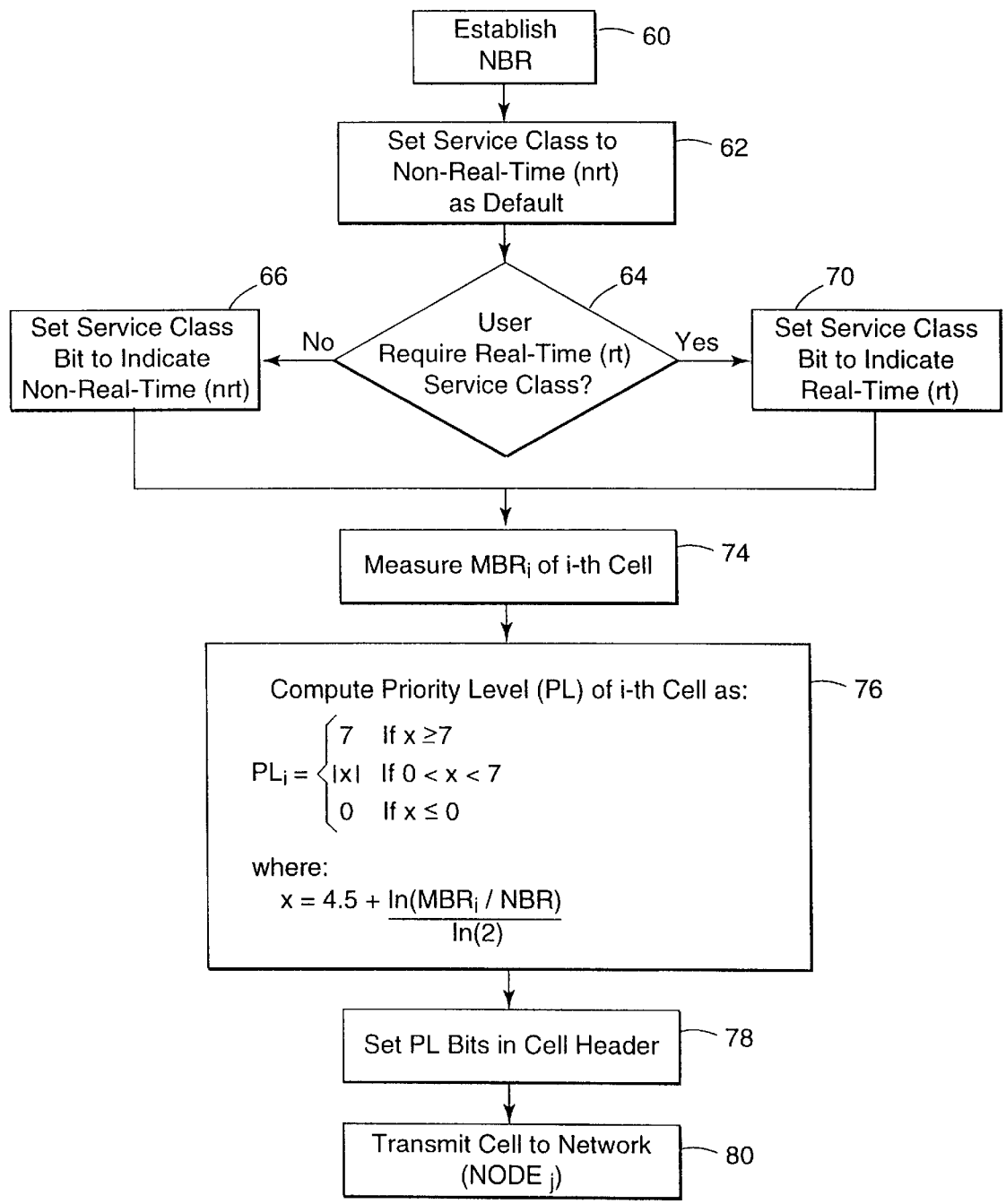
FIG. 3 illustrates in greater detail a procedure for transmitting cells of information between a user/network interface and a network using a nominal bit rate service in accordance with another embodiment is of the present invention.
Figure 4:
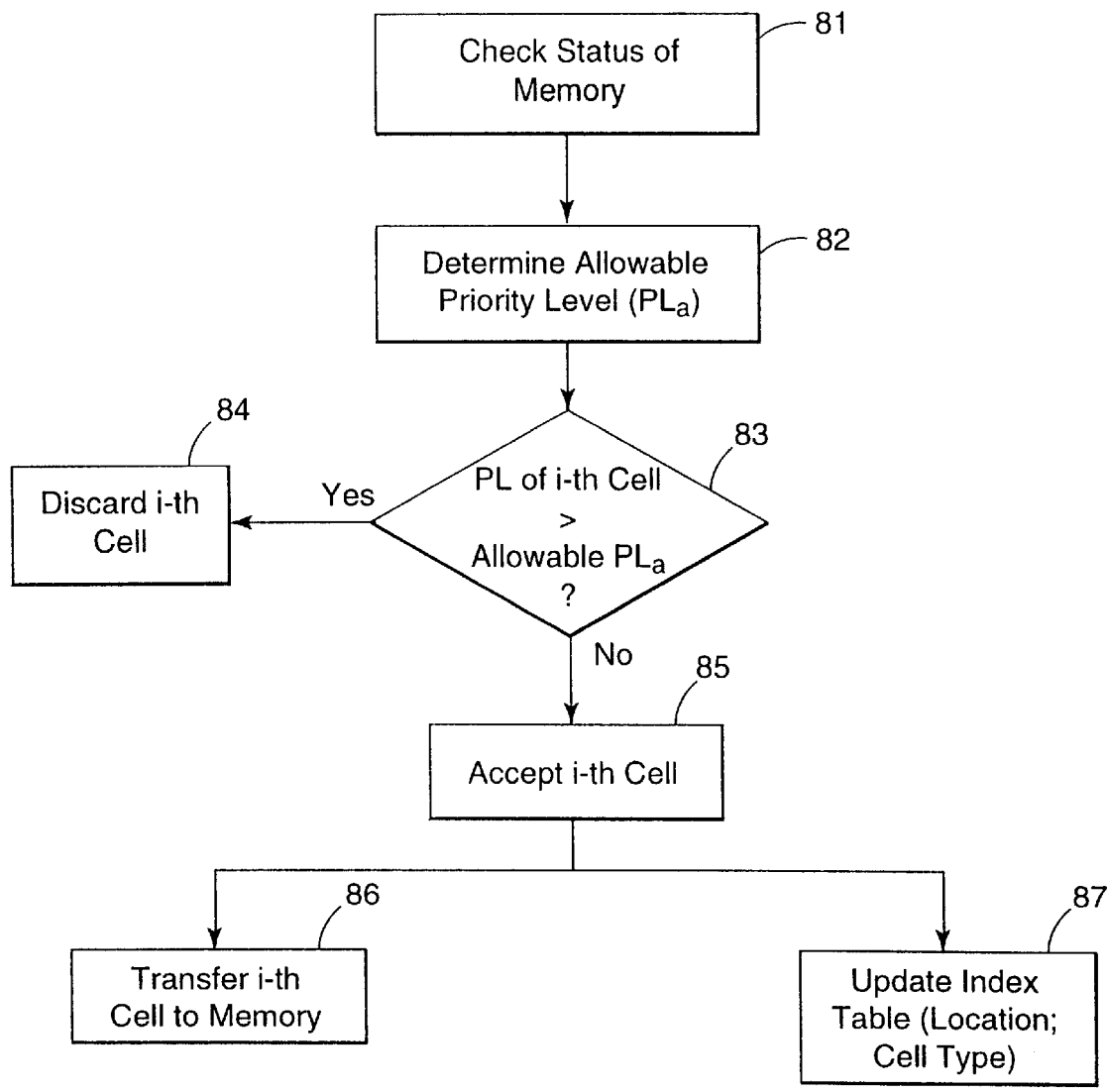
FIG. 4 illustrates in flow diagram form a general procedure for filtering cells at a network node in accordance with an embodiment of a nominal bit rate service.
Figure 5:
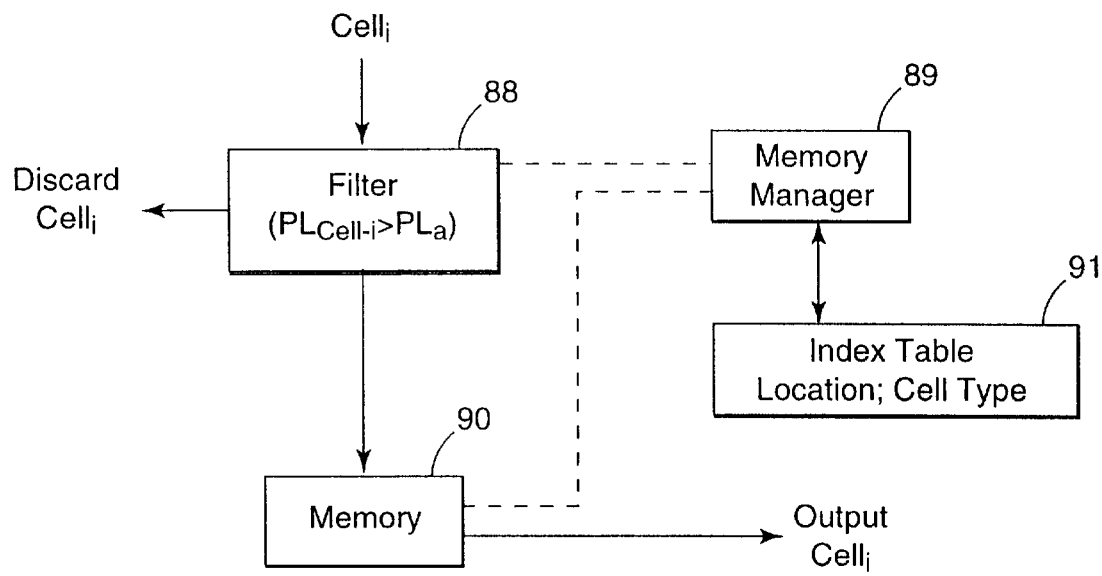
FIG. 5 is a block diagram of an embodiment of a system for filtering cells at a network node in accordance a nominal bit rate service.

FIGS. 3–5 illustrate in greater detail a procedure for scheduling and buffering cells in accordance with one embodiment of an NBR service methodology. As discussed previously, a user established 60 an NBR with the network operator 22. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI 24 will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a is connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI 24 and the network 30 is measured 74. Since, in practice, the actual bit rate may be subject to significant variability over time, the measuring unit 26 of the UNI 24 employs an averaging measuring principle to determine the actual or instantaneous bit rate, $MBR_i$.

In general, the UNI 24 measures 74 the actual bit rate of a cell, such as cell$_i$, by approximating the actual or instantaneous bit rate of the connection within a measuring period having a duration that is appropriate for the particular connection (e.g., a real-time or non-real-time connection). The instantaneous bit rate, $MBR_i$, may be determined using a known technique or by implementing a scheme in accordance with the following measuring concept.

In practice, since the actual bit rate may change significantly, it is desirable to apply an averaging measuring approach. The time scale of the measurement is dependent on the service class (real-time or non-real-time) associated with the cell or connection. The following measuring approach is based on a technique of computing an exponential moving average. For purposes of illustration, and not of limitation, it is assumed that the exponential moving average is calculated during each time slot of a specified duration at the UNI 24.

The measuring unit 26 at the UNI 24 measures the load of the connection between the UNI 24 and the network 30 at the instant of transmission of the i:th cell, referred to herein as cell$_i$. The load, $\rho_i$, of the connection may be determined by application of the following equation:

$$\rho_i = (1-\alpha)^{N_i} \rho_{i-1} + \alpha \qquad [1]$$

where, $N_i$ represents the distance between the (i:th) cell, cell$_i$, and the (i:th-1) cell, cell$_{i-1}$, measured in time slots, and $\alpha$ represents a parameter which defines the time scale of the averaging process.

Equation [1] is derived by assuming that the estimation process for determining the instantaneous load of a connection is updated during each time slot, but that all calculations are performed only at the instant of cell arrival at the measuring unit 26. The network operator 22 may use the following initial values for Equation [1]:

$$\rho_0 = 0;$$

and $$N_1 = C/NBR$$

where, C represents the connection capacity measured in bits per second at the UNI 24.

In order to determine an accurate steady-state value for a desired constant bit rate connection, the following conversion between load ($\rho_i$) and measured bit rate ($MBR_i$) may be applied:

$$MBR_i = \frac{C \ln(1-\alpha)}{\ln\left(1 - \frac{\alpha}{\rho_i}\right)} \qquad [2]$$

For the condition of $N_i > 10/\alpha$, Equations [1] and [2] may be combined and approximated by the following equation:

$$MBR_i = \frac{C}{N_i} \qquad [3]$$

In a typical implementation, the time scale, or time slots, defined for the averaging process is substantially constant, and as such, the parameter $\alpha$ may be assumed to be substantially constant. Given these assumptions, which are not to be construed as requirements, the derivation of $MBR_i$ in Equation [2] may be approximated by employment of a table having proper granularity. For similar reasons, at least the term $(1-\alpha)^{N_i}$ in Equation [1] may also be tabulated.

The proper value for the time scale parameter, $\alpha$, depends largely on the capacity of the buffer or memory reserved for the service class used by the connection. By way of example, a buffer employed to accept cells from a real-time connection requiring a relatively small CDV should be relatively small in size, and as such, the value of $\alpha$ must be quite high. On the contrary, when using a non-real-time service, a user typically wants to send bursts of cells without encountering high cell loss ratios. As such, $\alpha$ must be much smaller or, alternatively, the averaging period should be much longer.

For purposes of determining an estimated value for the time scale parameter $\alpha$, and assuming that no performance analysis data is available, the following approximation may be applicable:

$$\alpha \approx 5/K_j, \qquad [4]$$

where, $K_j$ represents the buffer capacity measured in cells reserved for a particular service class j. For example, a buffer capacity of 200 cells may be appropriate for a real-time service class, while a buffer capacity of 20,000 cells may be appropriate for a non-real-time service class. In this example, and applying Equation [4] above, the time scale parameter, $\alpha$, associated with the real-time buffer is 5/200 or 0.025. The time scale parameter, a, associated with the non-real-time buffer is 5/20,000 or 0.00025.

EXAMPLE #1

For purposes of illustration, and not of limitation, the following example of an application of the above-enumerated equations is provided. In this example, it is assumed that: two real-time connections or sources, $S_1$ and $S_2$, are transmitting cells; the buffer capacity, $K_j$, for the real-time service connections is 200 cells; the time scale parameter, $\alpha$, may be approximated using Equation [4] above such that $\alpha = 5/200$ or 0.025; the link capacity is C; and that for both connections, $S_1$ and $S_2$, $r(0)=1/50$, where r represents the connection load. It is also assumed that: connection $S_1$ is transmitting evenly distributed cells with a constant interarrival time of $N_i=50$ time slots, with $NBR_1=C/50$.

It is further assumed that connection $S_2$ is transmitting cells periodically in a way that the interarrival times between successive cells are 10 and 90, and $NBR_2=C/50$. If the time slots, $N_i$, are associated with cells designated by successive integers of increasing magnitude (i.e., 1, 2, 3, etc.), the arrival schedule for the cells of the connections, $S_1$ and $S_2$, may be represented by the relationship $N_j$ (cell$_i$).

In this example, the cell arrival schedule for connection $S_1$ may be represented as: 50(cell-1); 50+50(cell-2) or 100(cell-2); 100+50(cell-3) or 150(cell-3); 150+50(cell-4) or 200 (cell-4); 200+50(cell-5) or 250(cell-5), etc. The arrival schedule for the cells of connection $S_2$ may be represented as: 50(cell-1), 50+10(cell-2) or 60(cell-2), 60+90(cell-3) or 150(cell-3), 150+10(cell-4) or 160(cell-4), 160+90(cell-5) or 250(cell-5), etc.

For the real-time connection $S_1$, the following computations for each cell (first three cells shown below) may be made given by the above conditions and equations as:

$r$(cell-1)$=0.02(1-\alpha)^{50}+\alpha=0.03064$ $r$(cell-2)$=0.03064(1-\alpha)^{50}+\alpha=0.033643$ $r$(cell-3)$=0.033643(1-\alpha)^{50}+\alpha=0.03449$ The corresponding MBR values for the first three cells are as follows. A sample MBR computation for cell-1 is give below as:

$$MBR_{cell-1} = \frac{\ln(1-0.025)}{\ln\left(1-\frac{0.025}{0.03064}\right)}C = 0.01496C$$

$$MBR_{cell-2} = 0.01863C$$

$$MBR_{cell-3} = 0.01962C$$

It is noted that the constant C, which represents the link capacity, cancels out in subsequent computations. Using Equation [5] provided hereinbelow, the priority level of each cell may then be computed. A priority level computation involving the first cell (cell-1) is given as an example by the following:

$$PL_{cell-1} = int\left(4.5 + \frac{\ln\left(\frac{0.01496}{0.02}\right)}{\ln(2)}\right)$$

$$PL_{cell-1} = int(4.081)$$

$$PL_{cell-3} = 4$$

where, int(x) represents the integer part of the real number x. It can be seen by continuing the priority level computations for subsequent cells that all cells communicated over connection $S_1$, are assigned a priority level of 4.

For the second real-time connection $S_2$, similar computations for the first four cells result in the following:

$r$(cell 1)$=0.02(1-\alpha)^{50}+\alpha=0.03064$ $r$(cell 2)$=0.03064(1-\alpha)^{10}+\alpha=0.04879$ $r$(cell 3)$=0.04879(1-\alpha)^{90}+\alpha=0.03000$ $r$(cell 4)$=0.03000(1-\alpha)^{10}+\alpha=0.04829$ MBR(cell-1)$=0.01496C$ MBR(cell-2)$=0.03525C$ MBR(cell-3)$=0.01413C$ MBR(cell-4)$=0.03472C$ Computing the priority level for the first six cells of connection $S_2$, for example, results in the following cell priority level designations:

$PL_{cell-1}=4$ $PL_{cell-2}=5$ $PL_{cell-3}=3$ $PL_{cell-4}=5$ $PL_{cell-5}=3$ $PL_{cell-6}=5$ Referring once again to FIG. 3, and having determined 74 the measured bit rate, $MBR_i$, of the i:th cell, the priority level computing unit 28 computes 76 the priority level of the i:th cell using the measured bit rate, $MBR_i$, and the nominal bit rate, NBR. In accordance with one embodiment, it is assumed that a cell may be distinguished from other cells using a cell prioritization scheme that employs eight priority levels The illustrative example provided above, for example, assumes the availability of one of eight priority levels that may be assigned to a cell. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header format of the ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n-bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

The priority level computing unit 28 determines 76 the priority level of each cell, such as cell$_i$, using the computed value of MBR$_i$ and the value of NBR. In accordance with one embodiment of the present invention, and assuming that the measured bit rate is MBR$_i$ when the i:th cell is transmitted to the network 30, the priority level (PL$_i$) of cell$_i$ may be calculated using the following equation:

$$x = 4.5 + \frac{\ln(MBR_i / NBR)}{\ln(2)} \quad [5]$$

$$PL_i = \begin{cases} 7 & \text{if } x \geq 7 \\ \lfloor x \rfloor & \text{if } 0 < x < 7, \\ 0 & \text{if } x \leq 0 \end{cases}$$

where, $\lfloor x \rfloor$ represents the integer part of x. As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [5] above may be modified so as to produce cell priority levels ranging between PL=1 and PL=7, such that $\lfloor x \rfloor$ represents the integer part of x, if 1<x<7.

It can be seen by application of Equation [5] above that if a connection is exploiting network capacity in excess to the connection's negotiated NBR value, the priority level of cell$_i$ is at least 4. It can further be seen that if the momentary bit rate at the UNI 24 is less than the negotiated value of NBR, PL is at most 4.

The priority level scheme in accordance with this embodiment of the present invention thus permits adjustment of the relative capacity used by a connection in steps of 2. This result can be seen from the tabulated sample data provided in Table 1 below developed using Equation [5] above.

TABLE 1

| NBR (kbit/sec) | MBR (kbit/sec) | x | Priority Level (PL) |
|---|---|---|---|
| 100 | 566 | 7.00 | 7 |
| 100 | 348 | 6.30 | 6 |
| 100 | 204 | 5.53 | 5 |
| 100 | 100 | 4.50 | 4 |
| 100 | 49 | 3.47 | 3 |
| 100 | 18 | 2.03 | 2 |
| 100 | 12.7 | 1.52 | 1 |
| 100 | 8.8 | 0.99 | 0 |

From Table 1 above, it can be seen that if MBR is higher than 566 kbit/sec, PL is 7, and if MBR is lower than 8.8 kbit/sec, PL is 0.

The three priority level bits allocated in the cell header are set 78 for each ATM cell transferred from the UNI 24. The ATM cells are then transmitted 80 to targeted network nodes$_j$ identified by node addressing information provided in the cell header.

It is noted that if a user 20 is not satisfied with the quality of service of the connection, the user 20 may elect between at least three alternatives. First, the user 20 may elect to keep the average bit rate unchanging, but reduce the variation of traffic process. Second, the user 20 may elect to decrease the average bit rate, or to increase the nominal bit rate. Increasing the NBR will, however, generally result in a concomitant increase in cost for a higher speed connection. Finally, the user 20 may change the network operator 22.

In the above-description for measuring the actual bit rate or MBR of a cell, cell priority is determined according to the instantaneous cell rate of a particular connection. Measuring the MBR based solely on a sampling of the instantaneous cell rate at a particular moment in time, however, may not take into account whether a particular user has utilized a greater or lesser amount of network capacity prior to the time of sampling. Accordingly, it may be desirable to sample the transmission rate of cells over a particular connection a number of times or over a greater duration of time.

For a user that has exploited a relatively low level of network capacity over a given period of time in comparison to a user who continuously uses a relatively high level of network capacity, it may be desirable to reward the first user for exploiting less network capacity overall, such as by increasing the priority of a current cell. Such a measuring approach may be particularly useful when distinguishing between high average network capacity users and low average network capacity users, especially when such users are utilizing connections supporting variable bit rate video coding.

Figure 8:
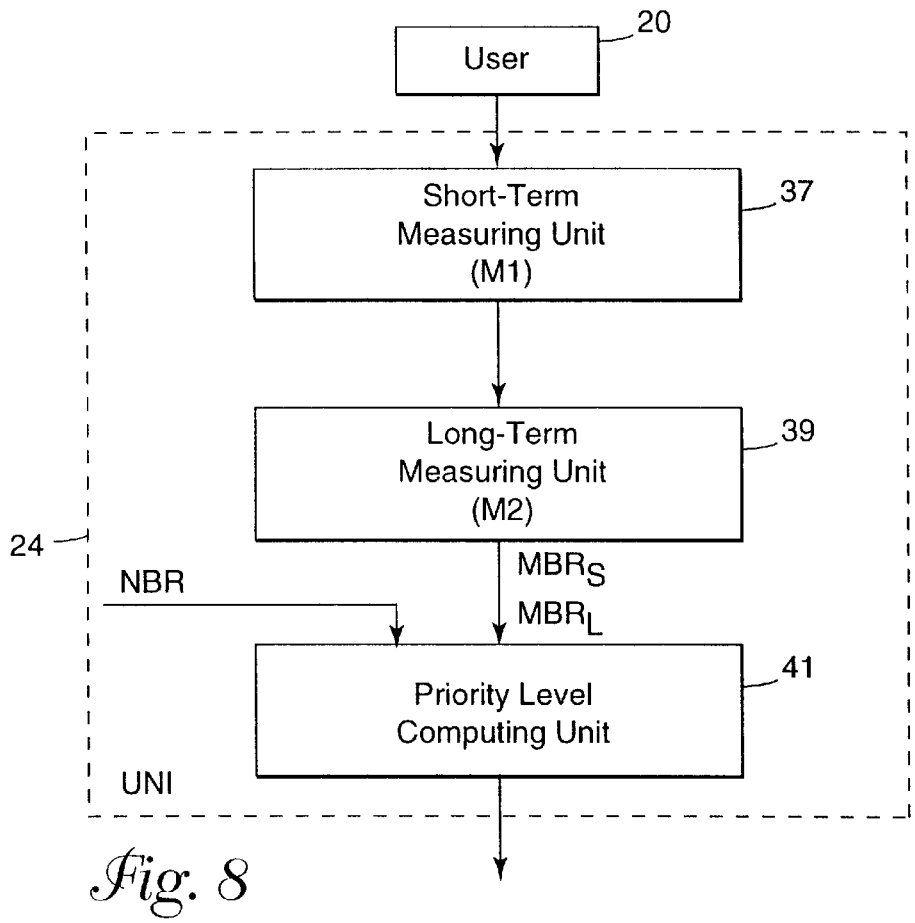
FIG. 8 is a block diagram of an embodiment of a user/network interface including a short-term measuring unit and a long-term measuring unit for determining a short-term and a long-term cell transmission rate of a connection, respectively.

With reference to FIG. 8, there is illustrated a depiction of a user/network interface 24 which may be viewed as replacing the UNI 24 illustrated in FIG. 2. The UNI 24 illustrated in FIG. 8, in contrast to that illustrated in FIG. 2, includes a short-term measuring unit M1 37 and, in addition, includes a long-term measuring unit M2 39. Each of these short-term and long-term measuring units M1 37 and M2 39 measures the actual bit rate of a connection over different time durations. The short-term measuring M1 37, for example, may measure the actual bit rate of a real-time connection by using measuring periods on the order of 0.1 ms, and measuring periods on the order of 10 ms for non-real-time connections.

The long-term measuring unit M2 39, in contrast, determines the actual bit rate of either a real-time or a non-real-time connection by utilizing measuring periods on the order of minutes, such as 10 minutes for example. The priority level computing unit 41 thus receives two MBR values, an MBR$_s$ value received from the short-term measuring unit M1 37 and an MBR$_1$ received from the long-term measuring unit M2 39. The priority level computing unit 41, using the values of MBR$_s$, MBR$_1$, and NBR, computes the priority level for each cell in a manner previously described hereinabove.

Figure 9:
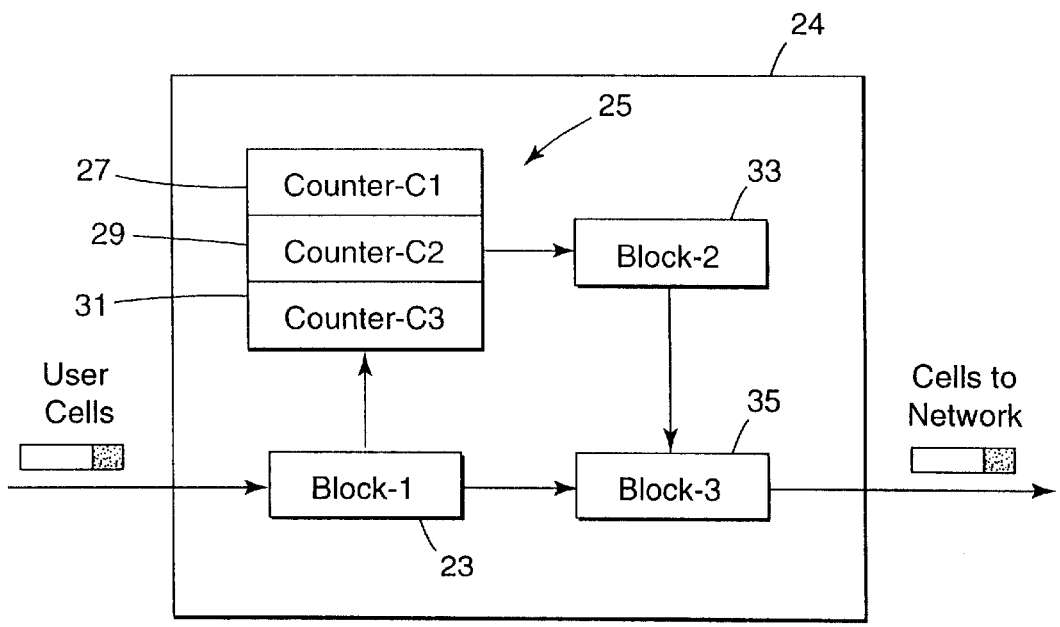
FIG. 9 illustrates in block diagram form another embodiment of a user/network interface including a short-term measuring unit and a long-term measuring unit.
Figure 10:
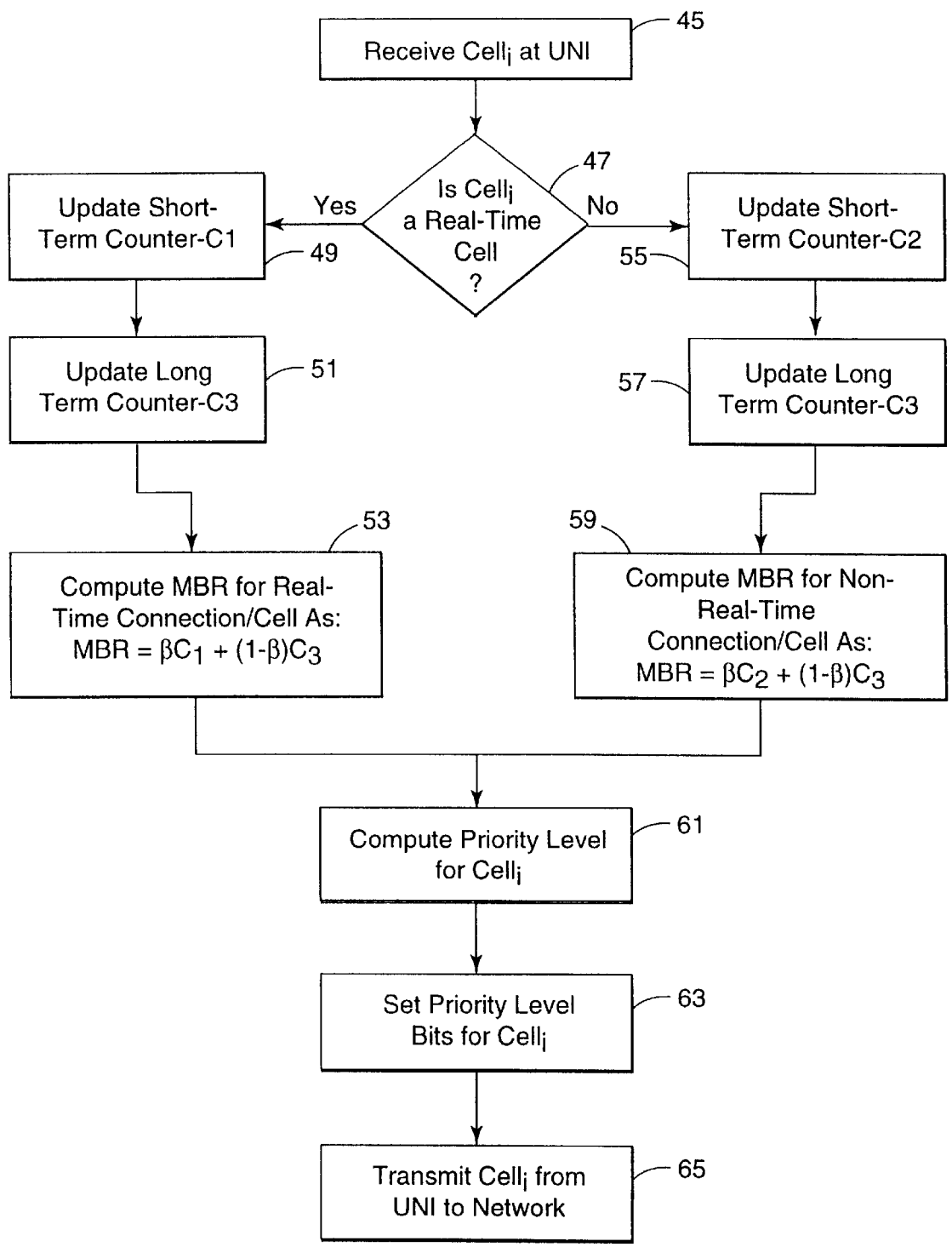
FIG. 10 is a flow diagram illustrating various process steps implemented by the user/network interface shown in FIG. 9.

With regard to FIGS. 9 and 10, there is illustrated in system block diagram form and flow diagram form, respectively, an embodiment of the UNI 24 illustrated in FIG. 8 which utilizes both short-term and long-term measuring units M1 37 and M2 39. Initially, a cell, such as cell$_i$, is received 45 at the UNI 24. At Block-1 23, a determination 47 is made as to whether cell$_i$ is a real-time cell or a non-real-time cell. If Block-1 23 determines that cell$_i$ is a real-time cell, Block-1 23 updates 49 the value of the short-term Counter-C1 27 provided in a counter unit 25. The value of the short-term Counter-C1 27 reflects the current short-term bit rate for real-time cells over a measuring period of approximately 0.1 ms.

Block-1 23 also updates 51 the value of the long-term Counter-C3 31, which reflects the current long-term bit rate of the connection using a measuring period of several minutes, such as 10 minutes. As such, the current long-term bit rate of the connection over the past 10 minutes is reflected in the long-term Counter-C3 31. Block-2 33 calculates the composite or total measured bit rate, MBR, for the real-time connection or cell based on both the current short-term and long-term bit rates reflected in Counters C1 27 and C3 31, respectively. The value of MBR for the real-time connection or cell is given by:

$$MBR = \beta C_1 + (1-\beta) C_3 \quad [6]$$

where, $\beta$ is a constant between zero and one, and $C_1$ and $C_3$ represent the values of the current short-term and long-term bit rates stored in Counters C1 27 and C3 31, measured in kbit/sec, respectively.

After computing the composite MBR for the real-time connection or cell, the priority level of $cell_i$ is computed 61 by Block-2 33. Block-3 35 sets 63 the priority level bits for $cell_i$, and then transmits 60 $cell_i$ from the UNI 24 to the network 30.

If it is determined 47 that $cell_i$ received at the UNI is a non-real-time cell, Block-1 23 updates 55 the value of the short-term Counter-C2 29. The value of the short-term Counter-C2 29 represents the current short-term bit rate for non-real-time cells or connections, typically measured over a duration of approximately 10 ms. Block-1 23 also updates 57 the long-term Counter-C3 31 in accordance with the manner previously described. Block-2 33 then computes 59 the composite MBR for the non-real-time connection or cell as:

$$MBR = \beta C_2 + (1-\beta) C_3 \quad [7]$$

where, $\beta$ is a constant between zero and one, and C2 and C3 respectively represent the values of the short-term Counter-C2 29 and the long-term Counter-C3 31, measured in kbit/sec. After the MBR has been computed 59 for the non-real-time connection or cell, Block-2 33 computes 61 the priority level of the non-real-time cell, $cell_i$. Block-3 35 sets 63 the priority level bits for $cell_i$, and transmits 65 the non-real-time $cell_i$ from the UNI 24 to the network 30.

Referring now to FIG. 4, there is illustrated in flow diagram form a general methodology by which a network node processes cells containing priority level information received from a UNI 24 in accordance with one embodiment of the present invention. FIG. 5 illustrates an embodiment of various components of a network node employed to effectuate the methodology illustrated in FIG. 4. It is assumed that a cell, such as $cell_i$, has been processed at a UNI 24 and includes priority level information derived in a manner described hereinabove.

$Cell_i$ is transmitted from the UNI 24 to a network node and is received at a filter 88 of the node. A memory manager 89 checks the status 81 of the memory 90 in order to determine the occupancy in the memory 90. The memory manager 89 determines 82 the allowable priority level ($PL_a$) based on the occupancy state of the memory 90. In general, the memory manager 89 establishes a high allowable priority which translates to a low allowable priority "level," for example $PL_a=0$ or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example $PL_a=6$ or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 83 by the memory manager 89, the filter 88 discards 84 $cell_i$. If, on the other hand, the priority level of $cell_i$ is equal to or less than the allowable priority level $PL_a$, the filter 88 accepts 85 $cell_i$. The memory manager 89 coordinates the transfer 86 of $cell_i$ to the memory 90 and updates an index table 91 coupled to the memory manager 89 to include a new index table entry for newly accepted $cell_i$. In one embodiment, the index table 91 stores the location of the accepted $cell_i$ in the memory 90, and also stores a cell-type indicator which specifies whether $cell_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 7:
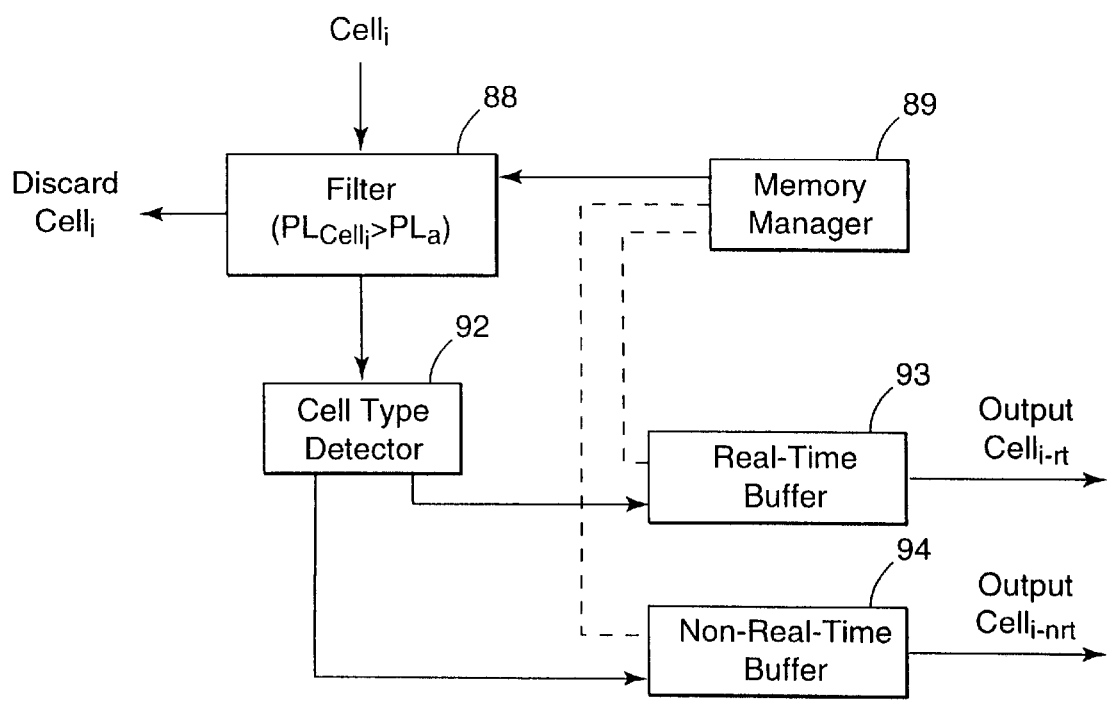
FIG. 7 is a block diagram of an alternative embodiment of a system for filtering cells at a network node in accordance with a nominal bit rate service.
Figure 6:
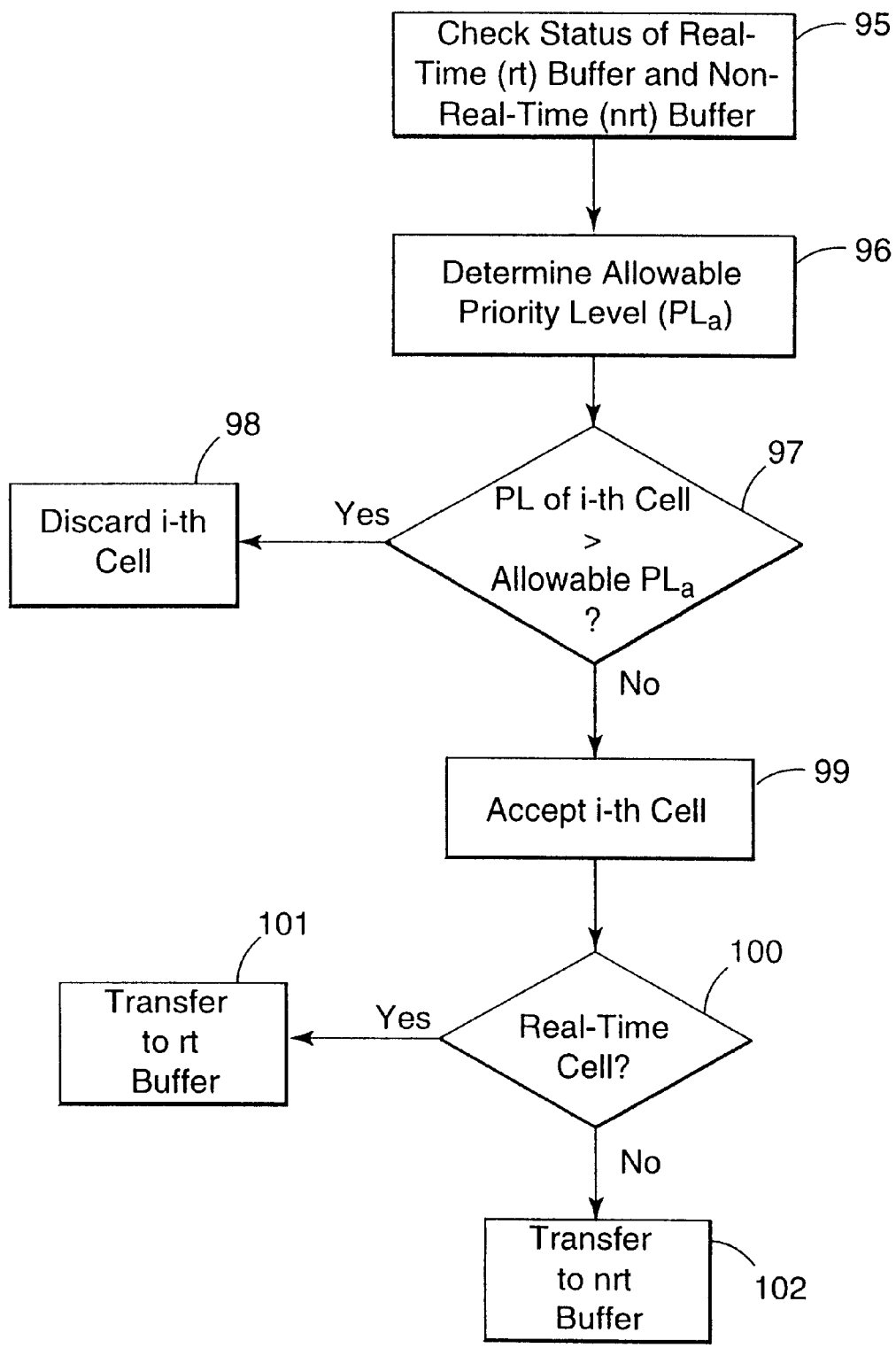
FIG. 6 illustrates in flow diagram form a general procedure for filtering cells at a network node in accordance with an alternative embodiment of a nominal bit rate service.

In accordance with another embodiment, as is illustrated in FIGS. 6 and 7, a memory manager 89 determines 95 the status of a real-time buffer (rt-buffer) 93 and a non-real-time buffer (nrt-buffer) 94. The memory manager 89 determines 96, in a manner similar to that previously described, the allowable priority level, $PL_a$, for the filter 88 based on the status of the rt-buffer 93 and the nrt-buffer 94. If the priority level of $cell_i$ is greater 97 than the allowable priority level, $PL_a$, the filter 88 discards 98 $cell_i$. If, on the other hand, the priority level of $cell_i$ is equal to or less than the allowable priority level, $PL_a$, $cell_i$ is accepted 99.

In accordance with another embodiment, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines 100 whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers 101, 102 the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

Figure 11:
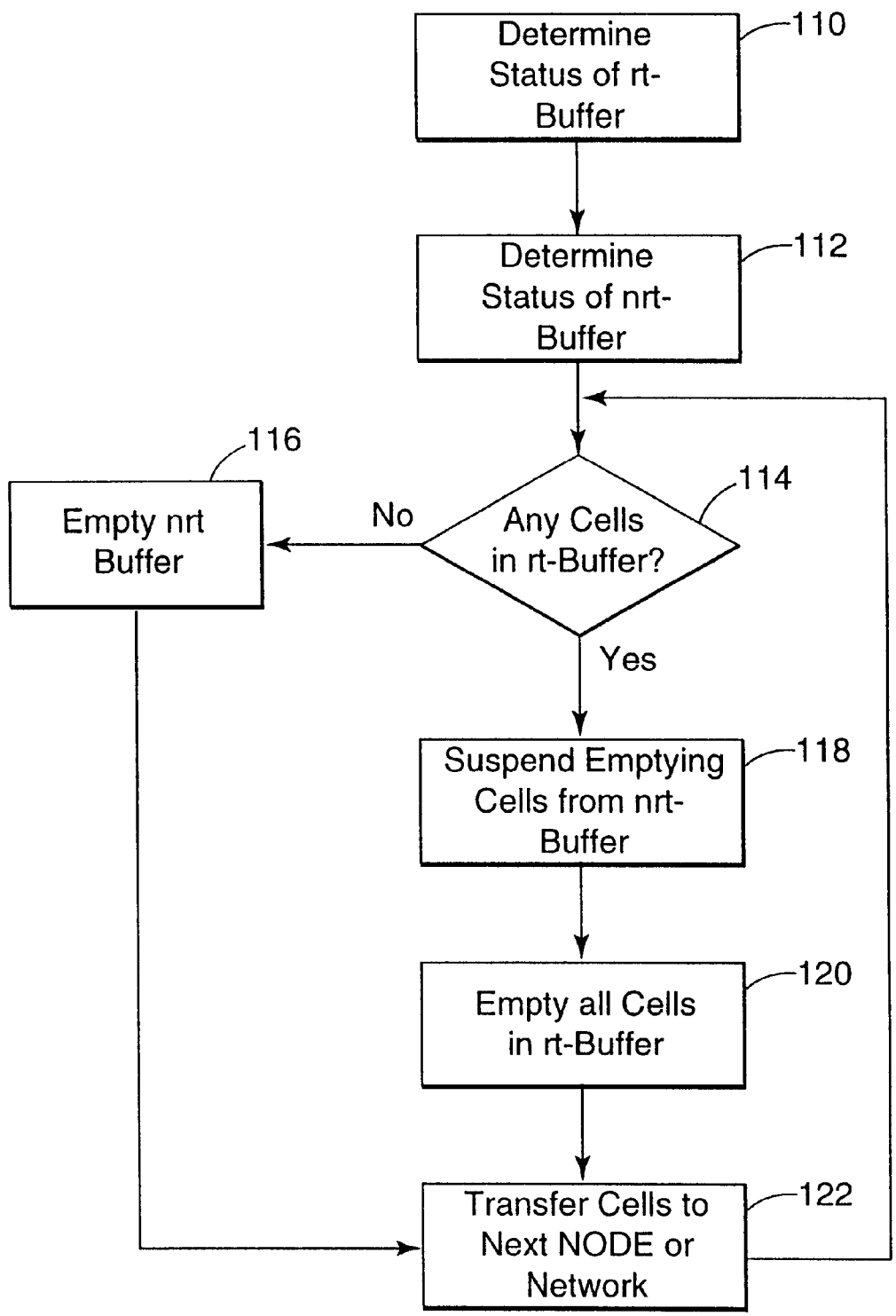
FIG. 11 is a flow diagram illustrating a procedure for controlling the transfer of cells buffered at a network node.

In accordance with another aspect of the present invention, an embodiment of which is illustrated in flow diagram form in FIG. 11, the memory manager 89 determines 110, 112 the status of the rt-buffer 93 and the status of the nrt-buffer 94. If the memory manager 89 detects 114 the presence of any cells in the rt-buffer 93, the memory manager 89 suspends 118 emptying of cells from the nrt-buffer 94, and transfers out 120 all rt-cells from the rt-buffer 93. The rt-cells output from the rt-buffer 93 are then transmitted 122 to another node in the network, or to another network. If the memory manager 89 determines that the rt-buffer 93 is empty, the memory manager 89 coordinates the transfer 116 of nrt-cells from the nrt-buffer 94 which are then transferred to another node in the network or to another network.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is noted that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #2

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{MAX}$=0.1, which represents 10 percent of the link capacity, C; the ON probability at the burst (or packet) scale=0.2; and the average burst duration =1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations.

It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer.

Using Equation [4] above for approximating the time scale parameter, α, we obtain the following time scale parameters for the real-time and non-real-time connections:

$\alpha_{rt}$=0.025

$\alpha_{nrt}$=0.001

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with $MBR_{MAX}$=0.1, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 2:

TABLE 2

| PRIORITY LEVEL | REAL (SIMULATED) PERCENTAGE OF OFFERED CELLS | PERCENTAGE BASED ON PEAK RATES |
| --- | --- | --- |
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 12:
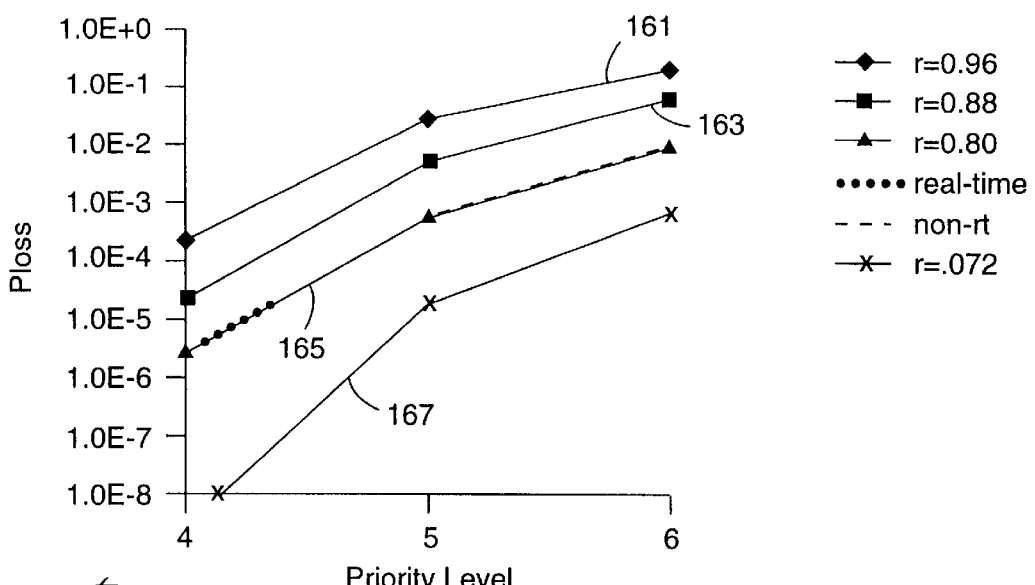
FIGS. 12–13 are graphical depictions of the is relationship of average cell loss ratio, $P_{loss}$, as a function of priority level for four specific load levels.

In FIG. 12, there is shown a graph illustrating the relationship of average cell loss ratio, $P_{loss}$, as a function of priority level for four specific load levels, r. In particular, line-167 represents an overall average load level of 0.72 for 9 connections of each connection type (i.e., real-time and non-real-time connection types). Line-165 depicts an average load level of 0.80 for 10 connections of each connection type. Further, line-163 represents an average load level of 0.88 for 11 connections of each connection type, and line-161 represents an average load level of 0.96 for 12 connections of each connection type. It is noted that, in the case of line-165 indicating a load level of 0.80, the cell loss ratios, $P_{loss}$, for real-time and non-real-time cells are indicated by dotted and broken lines, respectively.

Given, for example, a traffic scenario where the operator wants to offer a cell loss ratio of $10^{-6}$ to cells with priority 4, the total load can be approximately 0.75. It can be assumed that this average cell loss ratio is sufficient for most video applications. Give the same traffic load conditions, priority level 5, which corresponds to $P_{loss} \approx 10^{-4}$, can meet the requirements of many voice applications, while priority 6, which corresponds to $P_{loss} \approx 3 \cdot 10^{-3}$, is suitable for a TCP/IP type of file transfer, provided that there is an adequate packet discarding scheme in place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by $P_{loss,k}$, and the average loss ratio of cells with a priority of 0 to k is denoted by $P^*_{loss,k}$, then the following equation, which ignores buffering effect, provides that:

$$P^*_{loss,k} = \frac{\sum_{j:\lambda_j > c}^{43} Pr\{\lambda^*_k = \lambda_j\}(\lambda_j - c)}{\rho^*_k c} \quad [8]$$

-continued $$P_{loss,0} = P^*_{loss,0}$$

$$P_{loss,0} = \frac{\rho^*_k P_{loss,k} - \rho^*_{k-1} P^*_{loss,k-1}}{\rho^*_k - \rho^*_{k-1}} \text{ for } k = 1 \ldots 7$$

where, $\lambda^*_k$ represents the momentary bit rate level of all cells with a priority of 0 to k, $\rho^*_k$ represents the average offered load produced by these cells, and c represents the link capacity. The probability $\Pr\{\lambda^*k=\lambda_j\}$ can be calculated in a straightforward manner using known convolution techniques.

EXAMPLE #3

For purposes of further illustration, a second example is provided which assumes the same sources described in Example #2, except for the long ON and OFF periods. Because of the long periods reflected in Example #2, the peak rate always determines the cell priority. As the buffers are typically not capable of filtering any traffic variations, the allowed load in Example #3 is much lower than that in the original case of Example #2.

Figure 13:
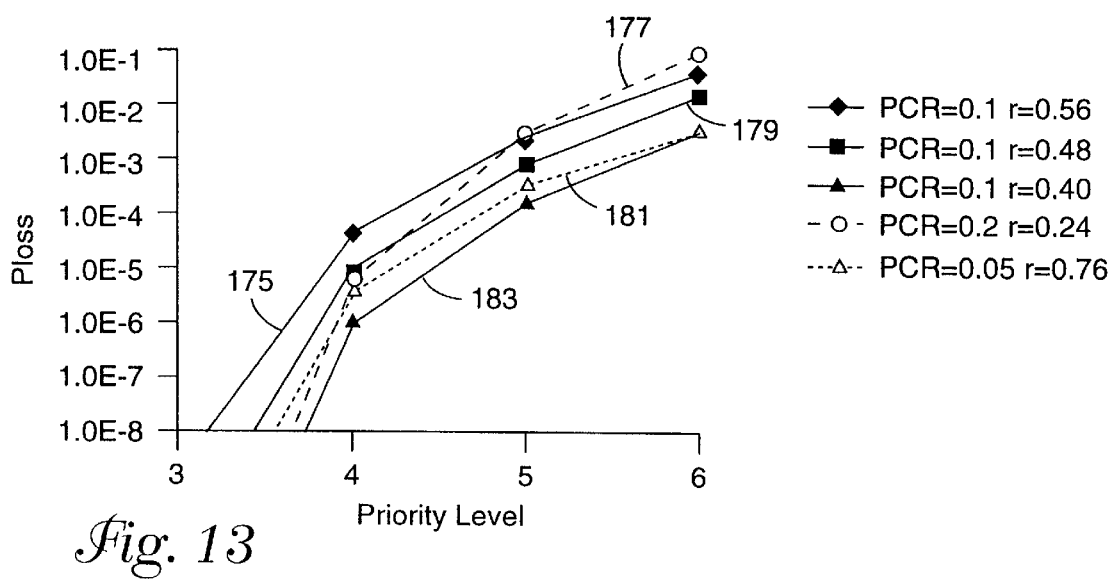

In FIG. 13, there is illustrated in graphical form a relationship between cell loss ratio as a function of priority level for different load levels, r. It is assumed in FIG. 13 that the peak cell rate of each connections depicted by solid lines 183, 179, 175 is 0.1, the peak cell rate of each connection depicted by the broken line 177 is 0.2, and the peak cell rate of each connection depicted by the dotted line 181 is 0.05.

FIG. 13 shows the cell loss probabilities obtained by application of Equation [8] for different priorities, depicted by the three solid lines, line-183, line-179, and line-175. In addition, two slightly different traffic cases are represented by the dotted line-181 and the broken line-177. The effects of changing the traffic variations are reflected in the graph provided in FIG. 13. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 12 and 13, it may be assumed that if priority level 4 offers a cell loss probability of $10^{-6}$, then the cell loss probability will be approximately $10^{-4}$ to $10^{-3}$ with priority level 5 depending on the overall traffic variations. The cell loss ratio with priority level 3 may be assumed to be less than $10^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

In another embodiment of the present invention, it may be desirable, for purposes of enhancing network expansion, traffic control, and charging for network services, to request that each user of the network purchase a maximum NBR, denoted as $NBR_{MAX}$. The $NBR_{MAX}$ value is intended to remain substantially constant. In addition, it may be desirable to request that each user select an appropriate instantaneous NBR, which should be no greater than the selected $NBR_{MAX}$. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

As discussed previously, the user selects a desired service class, although the non-real-time service class may be established as the default service class. If the user application is a real-time application, it is advisable that the user select the real-time service class, since this service class provides for a CDV that is sufficiently small for real-time applications.

It is noted that the cell stream process for a real-time connection should be very smooth if the user wants to achieve a relatively small cell loss ratio. This can be appreciated in view of the relatively short measuring period, approximately 0.1–0.3 ms for example, when determining the priority level of real-time cells at the UNI 24. If, for example, there occurs large bursts of real-time cells, then some of these cells will likely be marked with the lowest priority (i.e., PL=7). If the application does not require a small CDV, it is considered more desirable for the user to select the non-real-time service, because this service class allows for relatively large cell bursts to occur without producing significant changes in the value of PL.

Another advantage offered to providers of an NBR network service concerns a significant reduction in the difficulties associated with dimensioning a network and properly allocating bandwidth amongst a multiplicity of network connections. In accordance with the principles of the NBR service paradigm disclosed herein, network dimensioning is based on an average quality of service offered to nominal connections. In practice, a network operator measures the cell loss ratio of cells having a priority level of 4 (i.e., cells in which the MBR is substantially equal to the NBR). If the measured CLR value is determined to be greater than a reasonable threshold, such as $10^{-6}$ for example, the network operator should consider increasing the capacity of the network after identifying the location of a bottleneck. It is noted that this capacity increase may be accomplished in a simple and straightforward manner, since this determination does not require concern of the switching structure, and the capacity division between traditional service classes or virtual paths, for example.

It is noted that higher priority levels (e.g., PL=5, 6, and 7) are primarily used by the network operator to allocate remaining network capacity amongst highly variable connections. It is further noted that the cell loss ratio for cells having a priority level of 7 could be temporarily very high, even upwards to 100%, while the cell loss ratio for cells having a priority level of less than 3 should be negligible, such as on the order of less than $10^{-9}$.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [5] above is modified so as to produce cell priority levels ranging between PL=1 and PL=7, such that $\lfloor x \rfloor$ represents the integer part of x, if 1<x<7. However, if the network operator wants to mark excessive cells as CLP=1 cells, those cells may be marked with a lower priority, such as PL=6, for example.

As was discussed previously, a point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. As mentioned previously, it may be possible to use the current Generic Flow Control (GFC) field in the cell header which constitutes four bits. In this case, all three priority bits and the rt/nrt service bit can be situated in the cell header. If this is not possible, the required bits (2, 3 or 4 depending on the use of CLP bit and the status of rt/nrt bit) may be situated outside the current cell header.

Including the rt/nrt service bit in each cell header may further simplify the implementation of cell scheduling and buffering (CSB) blocks and core network nodes, as the blocks do not need to keep record of every connection. If the location of the rt/nrt service bit is known and stable, then the CSB blocks can operate autonomously or independent of other parts of the node. In addition, this approach may alleviate some problems with connectionless traffic, even though this type of traffic can be assumed to use non-real-time class services.

In addition, there should be implemented a simple connection admission control (CAC) method, such as one based on peak rate allocation. Peak rate allocation should be a satisfactory basis for a CAC method because, in practice, the fee for use of a conventional ATM connection with a priority level of zero will essentially be higher than the charge of a SIMA connection with the same bit rate and a priority level of 3 or 4. Also, the SIMA scheme disclosed herein very efficiently exploits the capacity between the allocated and actual used bit rates of VBR connections, as there is no real capacity allocation for different connections or services. A possible interworking scheme for transferring ATM services over a SIMA network is presented in Table 3 below:

TABLE 3

| ATM SERVICE | CLP | SIMA CLASS rt/nrt | PRIORITY LEVEL | CONNECTION ACCEPTANCE IN SIMA NETWORK |
|---|---|---|---|---|
| CBR | 0 | rt | 0 | Peak Rate Allocation |
|  | 1 | rt | 5 or 6 | — |
| rt-VBR | 0 | rt | 0 | Peak Rate Allocation |
|  | 1 | rt | 5 or 6 | — |
| nrt-VBR | 0 | nrt | 0 | Peak Rate Allocation |
|  | 1 | nrt | 5 or 6 | — |
| ABR | 0 | nrt | ? | ? |
|  | 1 | nrt | ? | ? |
| UBR | 0 | nrt | 5 or 6 | Not Applicable |
|  | 1 | nrt | 6 or 7 | Not Applicable |

Figure 14:
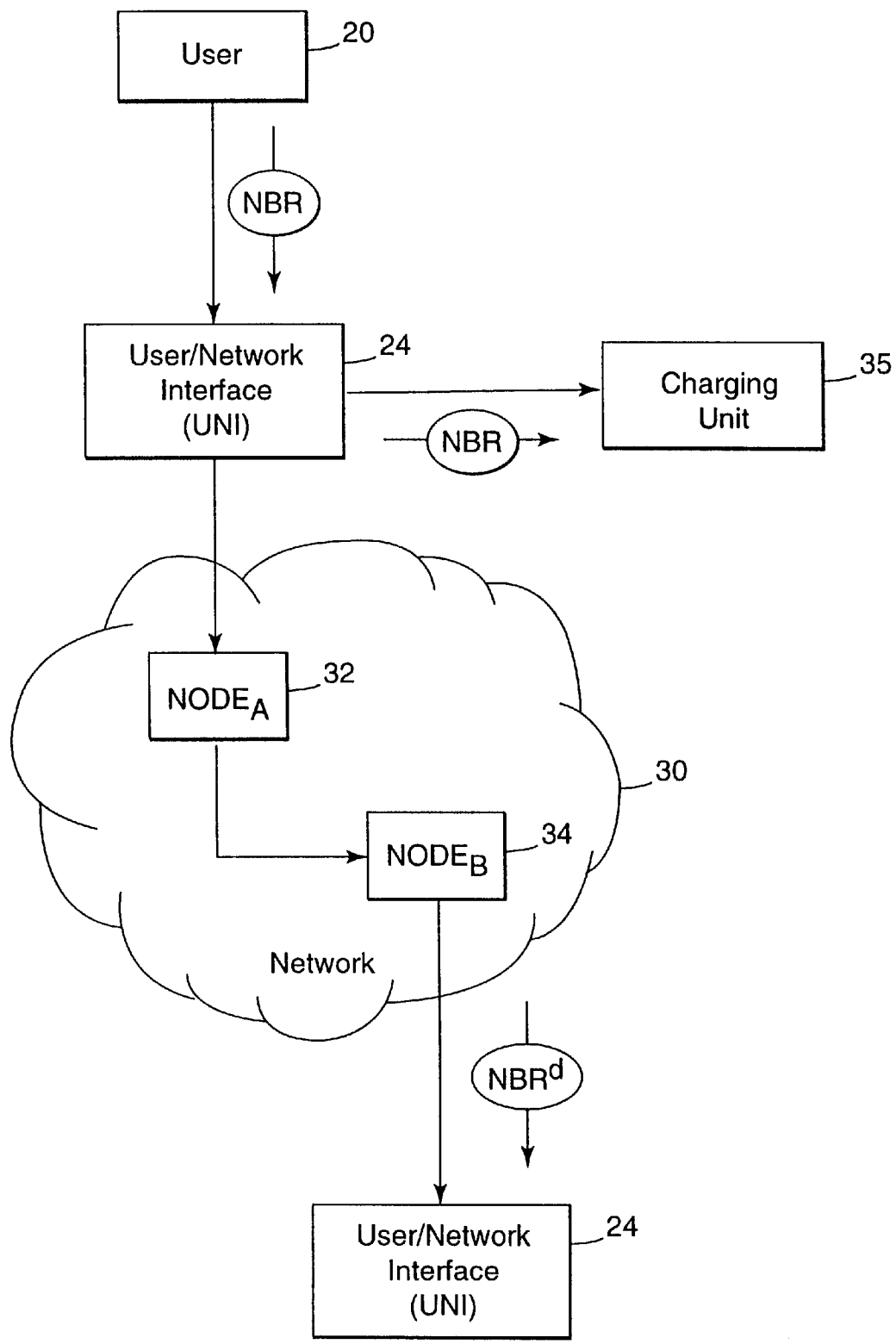
FIG. 14 is a diagram of an accounting scheme for use with a nominal bit rate service.

Referring now to FIG. 14, there is shown an embodiment of a system which accounts for usage of an NBR service connection established in a network 30. As discussed previously, the elegant simplicity of the NBR service concept disclosed herein provides for the implementation of a relatively uncomplicated yet effective fee charging scheme. The skilled artisan will appreciate that the relative simplicity of the accounting scheme illustrated in FIG. 14 is realizable by virtue of the SIMA/NBR service paradigm.

Service providers may charge users for service usage on a number of bases, including a minute, hour, weekly, monthly, or transactional basis, for example. For purposes of illustration, and not of limitation, the charging scheme described below assumes that users of services supported on an NBR connection will be charged on a monthly basis. It is to be understood that the basis for charging for service usage, as well as the charging methodology, may vary from that described herein without departing from the scope and spirit of the present invention. For example, a charging schedule may be employed that accounts for both a fixed or non-fixed monthly fee, as well as a time dependent fee based on the time duration of the connection.

In accordance with an embodiment in which charges are assessed on a monthly basis, a monthly fee, which is assessed to a user 20 of the network 30, is based on a maximum allowed NBR, denoted as $NBR_{max}$, which is selected by, or otherwise established for, the user 20. In addition, a time dependent portion of the monthly fee may be assessed which is proportional to the user's NBR for each connection at a given point in time. The charging Equation [9] below takes into account that the NBR may be different for upstream and downstream transmissions. Consequently, the total charge assessed to a customer during a monthly time period may be characterized by the following equation:

$$X = \beta_1 NBR_{\max} + \beta_2 \left( \sum_i (NBR_i^u + NBR_i^d) t i \right) \quad [9]$$

where, $t_i$ represents the holding time of connection i with an upstream nominal bit rate $NBR_i^u$ and a downstream nominal bit rate $NBR_i^d$, and the dimensions for $\beta_1$ and $\beta_2$ are $/(kbit/sec)$ and $/(kbit/sec)/min$, respectively. It is noted that the term "$" in the dimensions of $\beta_1$ and $\beta_2$ may reflect any monetary unit of charge. The charging counter 35 may be updated on a periodic basis, such as once a second for example, or on a non-periodic basis.

It is acknowledged that more complicated and sophisticated charging functions may be used instead of the linear scheme presented above in Equation [9]. However, it would appear undesirable to complicate the accounting approach when such is believed to be unnecessary and would likely result in increased implementation costs and administrative overhead. It may be desirable, however, to utilize a non-linear approach rather than the linear approach embodied in the formulation of Equation [9] above.

It is further acknowledged that use of the parameter $NBR_{MAX}$ significantly reduces the complexity of a resulting accounting system, but requires that the user purchase or select an $NBR_{MAX}$ value. The primary reason for using $NBR_{max}$ is to minimize network dimensioning difficulties. Because the sum of $NBR_{max}$ for different customers is known and relatively constant, the network operator can easily compute the maximum load level associated with each priority level, and may even predict the quality of service for each of the different priority levels.

It is noted that a user may be permitted to change the value of NBR during the duration of the connection because such a change has effect only at the user's UNI 24. This approach, however, may complicate network dimensioning because the total sum of NBRs of different connections can vary significantly depending on the network load. As such, it would appear desirable to implement an accounting scheme based on a monthly fee, which may include a connection time fee portion, and a maximum allowed NBR which does not change during the duration of the connection.

Alternatively, if it is desired to implement a charging scheme having an NBR that may be varied during the existence of a connection, the information of any such change in NBR should be delivered to the other end of the connection. It is understood that any network node inside the network does not need to know the values or changes of NBR. It should be further noted that the above-described charging scheme indirectly takes into account bit rate, quality of service and traffic variations, the effect of network load, and user expectations and willingness to pay for usage of network services.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. A method of charging for usage of a connection between a network access node and a node of a network, comprising:

transmitting cells of information over the connection in accordance with a nominal bit rate service comprising:
   establishing a nominal bit rate service connection according to a request received by a network operator from a user for the nominal bit rate service connection;
   measuring an actual bit rate of the connection for the nominal bit rate service connection; and
   changing a probability of cell acceptance at the network node for the nominal bit rate service connection in response to a change in the actual bit rate relative to the nominal bit rate; and computing a cost for usage of the connection based upon the established nominal bit rate service connection.

2. The method of claim 1, wherein changing the probability of cell acceptance at the network node comprises increasing the probability of cell acceptance at the network node in response to a decrease in the actual bit rate relative to the nominal bit rate.

3. The method of claim 1, wherein changing the probability of cell acceptance at the network node comprises decreasing the probability of cell acceptance at the network node in response to an increase in the actual bit rate relative to the nominal bit rate.

4. The method of claim 1, further comprising designating the connection as a real-time connection or a non-real-time connection.

5. The method of claim 1, wherein computing the cost for usage of the connection further comprises computing the cost using the nominal bit rate and a connection time, the connection time representing a period of time during which the connection is used.

6. The method of claim 1, wherein computing the cost for usage of the connection further comprises:

designating a maximum nominal bit rate for the connection, the maximum nominal bit rate representing a limit which the nominal bit rate is not permitted to exceed; and computing the cost using the nominal bit rate and the maximum nominal bit rate.

7. The method of claim 1, wherein computing the cost for usage of the connection further comprises:

designating a maximum nominal bit rate for the connection, the maximum nominal bit rate representing a limit which the nominal bit rate is not permitted to exceed;

establishing a first fee rate and a second fee rate; and computing the cost using the nominal bit rate modified by the first fee rate and the maximum nominal bit rate modified by the second fee rate.

8. The method of claim 1, wherein computing the cost for usage of the connection further comprises computing the cost using the nominal bit rate for upstream and downstream transmissions, respectively.

* * * * *